(12) United States Patent
Young et al.

(10) Patent No.: US 8,974,948 B2
(45) Date of Patent: Mar. 10, 2015

(54) LOW COST, HIGH POWER, HIGH ENERGY DENSITY, SOLID-STATE, BIPOLAR METAL HYDRIDE BATTERIES

(75) Inventors: Kwo Young, Troy, MI (US); Michael A. Fetcenko, Rochester, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 0 days.

(21) Appl. No.: 12/930,686

(22) Filed: Jan. 13, 2011

(65) Prior Publication Data

US 2012/0183835 A1 Jul. 19, 2012

(51) Int. Cl.
*H01M 10/0562* (2010.01)
*H01M 10/34* (2006.01)

(52) U.S. Cl.
CPC .... *H01M 10/345* (2013.01); *H01M 2300/0074* (2013.01); *Y02E 60/124* (2013.01)
USPC .......................................... 429/149

(58) Field of Classification Search
USPC ...................... 429/149, 218, 231.8, 306, 314
See application file for complete search history.

(56) References Cited

U.S. PATENT DOCUMENTS

| | | | |
|---|---|---|---|
| 5,512,387 A * | 4/1996 | Ovshinsky .................... 429/152 |
| 5,616,432 A * | 4/1997 | Ovshinsky et al. ............. 429/59 |
| 2006/0020070 A1* | 1/2006 | Chisholm et al. ............. 524/406 |
| 2010/0209779 A1* | 8/2010 | Wendman ..................... 429/310 |
| 2010/0233548 A1* | 9/2010 | Pijnenburg et al. ........... 429/322 |

* cited by examiner

*Primary Examiner* — Patrick Ryan
*Assistant Examiner* — Alex Usyatinsky
(74) *Attorney, Agent, or Firm* — Gifford, Krass, Sprinkle, Anderson & Citkowski, P.C.

(57) ABSTRACT

A solid state battery including at least one multilayered battery cell comprising: 1) a layer of negative electrode material; 2) a layer of positive electrode material; and 3) a layer of perovskite-type oxide material disposed between the layer of positive electrode material and the layer of negative electrode material, where said layer of perovskite-type oxide material is electrically insulating and capable of readily conducting or transporting protons.

16 Claims, 2 Drawing Sheets

LOW COST, HIGH POWER, HIGH ENERGY DENSITY, SOLID-STATE, BIPOLAR METAL HYDRIDE BATTERIES

FIELD OF THE INVENTION

The present invention relates generally to thin-film all solid-state metal-hydride batteries employing solid state electrolyte. More specifically the present invention relates to low cost, high power, high energy density, solid-state, non-aqueous, bipolar metal hydride batteries useful for HEV/PHEV applications.

BACKGROUND OF THE INVENTION

Rechargeable batteries are used in almost every aspect of daily life. A wide variety of industrial, commercial and consumer applications exist. In addition to automotive applications, larger capacity battery uses include such applications as fork lifts, golf carts, uninterruptable power supplies for protection of electronic data storage, and even energy storage for power production facilities. In the hybrid vehicle market, demand for low weight, high charge capacity batteries is rapidly increasing.

In hybrid electric vehicles (HEV), weight is a significant factor. This is particularly true in hybrid electric vehicle (PHEV) because a large component of the total weight of the vehicle is the weight of the batteries, reducing the weight of the cells is a significant consideration in designing batteries to power electric vehicles.

Current metal hydride batteries are is too heavy for PHEV application. The driving range is very limited, for example, a Toyota Prius® HEV modified by Gold Peak into a PHEV can only deliver 40 pure-electrical miles before the gasoline engine must kick in to propel the vehicle and recharge the batteries.

Current lithium-ion (Li-ion) battery technology is not mature enough to be used in vehicle applications. In its description of ongoing research efforts to develop high-power batteries for HEVs, the DOE said "High-power energy storage devices are among the critical technologies essential for the development and commercialization of HEVs." Doe concerns with Li-ion technology include cost, performance, abuse tolerance, and calendar life:

Cost—The current cost of Li-based batteries is approximately a factor of two too high on a kW basis. The main cost drivers being addressed are the high cost of raw materials and materials processing, the cost of cell and module packaging, and manufacturing costs.

Performance—The barriers related to battery performance include a loss in discharge power at low temperatures and power fade over time and/or when cycled.

Abuse Tolerance—Many high-power batteries are not intrinsically tolerant to abusive conditions such as short circuits (including internal short circuits), overcharge, over-discharge, crush, or exposure to fire and/or other high-temperature environment.

Life—The calendar life target for hybrid systems (with conventional engines) is 15 years. Battery life goals were set to meet those targets. The 15-year calendar life is yet to be demonstrated.

Furthermore, Li-ion batteries will not be a cost-effective solution for HEVs unless manufacturing costs are slashed by 50% and for PHEVs unless manufacturing costs are slashed by 67% to 80%.

Thus, there is a need in the transportation field for a low cost, high power, high energy density, battery technology.

SUMMARY OF THE INVENTION

The present invention is a solid state battery including at least one multilayered battery cell comprising: 1) a solid state layer of negative electrode material capable of adsorbing and desorbing protons during charge and discharge; 2) a solid state layer of positive electrode material capable of desorbing and adsorbing protons during charge and discharge; and 3) a solid state layer of perovskite-type oxide material disposed between the layer of positive electrode material and the layer of negative electrode material, where the layer of perovskite-type oxide material is electrically insulating and capable of readily conducting or transporting protons from the layer of positive electrode material to the layer of negative electrode material while the battery is charging and from the layer of negative electrode material to the layer of positive electrode material while the battery is discharging.

The layers of negative electrode material, positive electrode material, and perovskite-type oxide material may be thin film materials. The layer of positive electrode material may comprise a transition metal hydroxide. The transition metal hydroxide may be a nickel hydroxide material which may provide approximately one electron transfer. The transition metal hydroxide may be a γ-phase nickel hydroxide which may provide approximately 1.7 electron transfer. The layer of negative electrode material may be a metal hydride material, which may be a disordered or multiphase material, which includes one or more of amorphous, nanocrystalline, microcrystalline or polycrystalline phases. The layer of negative electrode material may include a Mg—Ni type hydrogen storage alloy material. The perovskite-type oxide material may comprise one or more elements selected from the group consisting of Ba, Sr, Zr, Sc, Y, La, Ce, Pr, Nd, Pm, Sm, Eu, Gd, Tb, Dy, Ho, Er, Tm, Yb, Lu, Fe, Cr, Al, Ti, Mg, Sn, and In.

The multilayered battery cell may further include electrically conductive bottom and top battery terminal layers adjacent to the solid state layers of negative electrode material and positive electrode material and remote from the solid state layer of perovskite-type oxide material. The electrically conductive bottom and top battery terminal layers may be formed from an electrically conductive metal selected from the group consisting of aluminum, nickel, copper and alloys, mixtures or composites thereof. Preferably, the electrically conductive bottom and top battery terminal layers may be formed from aluminum. The electrically conductive bottom and top battery terminal layers may be formed from an electrically conductive ceramic or oxide material.

The solid state battery may include more than one multilayered cells and may further comprise: battery terminal layers disposed between the layer of positive electrode material of one multilayered cell and the layer of negative electrode material of an adjacent multilayered cell. The battery terminal layers disposed between the multilayered cells may be formed from aluminum.

DETAILED DESCRIPTION OF THE INVENTION

Present rechargeable battery systems can be classified into two groups those employing liquid electrolytes and those employing solid electrolytes. Liquid electrolyte systems have been around for many decades and are the most well known to the general public. Examples of liquid electrolyte rechargeable battery systems include lead-acid, nickel cadmium, and the more recent nickel-metal hydride systems.

A more recent advancement is the solid electrolyte rechargeable battery systems. The solid electrolyte devices have several distinct advantages over those based on liquid electrolytes. These include (1) the capability of pressure-packaging or hard encapsulation to yield extremely rugged assemblies, (2) the extension of the operating temperature range since the freezing and/or boiling-off of the liquid phase, which drastically affect the device performance when employing liquid electrolytes are no longer a consideration, (3) solid electrolyte devices are truly leak-proof, (4) they have long shelf life due to the prevention of the corrosion of electrodes and of loss of solvent by drying out which occur when using liquid electrolytes, (5) solid electrolytes permit micro-miniaturization, and (6) the do not require heavy, rigid battery cases which are essentially "dead weight" because they provide no additional capacity to the battery but must be included in the total weight thereof. All of the above considerations have led to a growing use of solid electrolytes.

Non-aqueous metal hydride batteries allows higher operating voltage, lighter packaging (no internal pressure issues), improved self-discharge and longer cycle life. However, the conventional non-aqueous NiMH suffers from low power and high cost.

In forming such a battery system, a solid ion conductor (i.e. solid electrolyte) for moving ions within the system is required. A solid electrolyte is classified by its type of movable ion, such as $Li^+$-conductive solid electrolyte, $Ag^+$-conductive solid electrolyte, $Cu^+$-conductive solid electrolyte, $H^+$-conductive solid electrolyte, etc. A solid battery element is constituted by combining one of these solid electrolytes with appropriate electrode materials. Several solid electrolytes are known to exhibit good ionic conductivity, some of which exist in the form of thin films. Oxide ion conductors such as zirconia are operated at high temperatures due to their low conductivity at ambient temperatures. Chloride ion conductors such as $PbCl_2$ and $BaCl_2$ have similar temperature restrictions. Silver ion conductors such as AgBr, AgCl, and AgI also show low ionic conductivity at room temperature.

Figure 1:
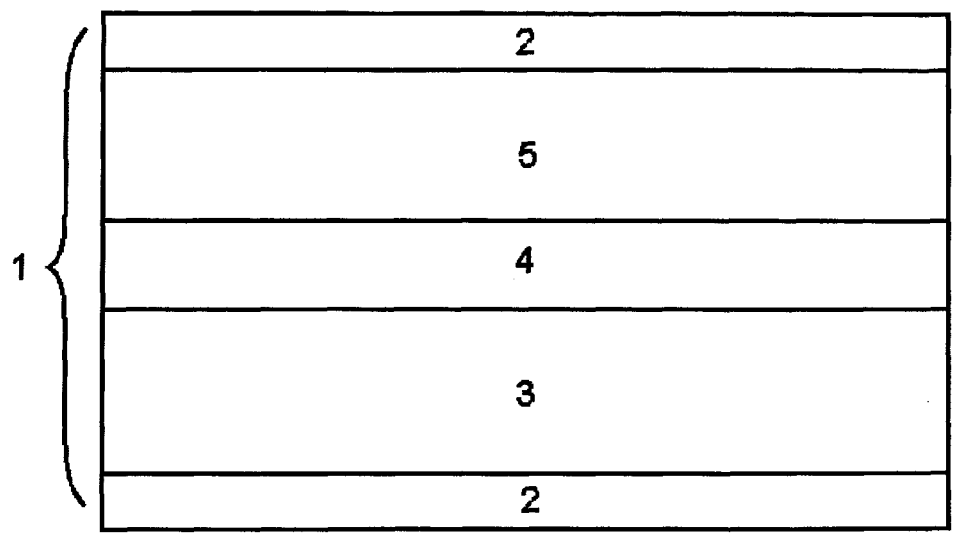
FIG. 1 is a schematic depiction of a cross-section of a single bipolar cell of the solid MH battery of the present invention.

FIG. 1 is a cross-sectional depiction of a thin-film solid state battery 1 of the present invention. The battery includes electrically conductive bottom and top battery terminal layers 2. The electrically conductive material used to form the battery terminal layers 2 may be an electrically conductive metal such as aluminum, nickel, copper and alloys, mixtures or composites thereof. The electrically conductive material may even be an electrically conductive ceramic or oxide material. For maximum weight savings, battery terminal layers 2 should be only as thick as needed to perform their support and conduction functions. Any additional thickness will only increase the "dead weight" of the battery. Typically the thickness of the battery terminal layers 2 will not be greater than about 20 microns preferably between 0.5 and 10 microns thick. Deposited on between the battery terminal layers 2 is at least one multi-layered battery cell. Each battery cell includes a thin-film negative electrode layer 3, a thin-film positive electrode layer 5 and a thin-film solid electrolyte proton conductive layer 4.

The thin-film negative electrode layer 3 is typically between about 1 and 100 microns thick and is formed from a material which adsorbs and desorbs protons during charging and discharging thereof, respectively. Typically the layer is formed from hydrogen storage materials such as metal hydride materials. These metal hydride material may be any of those already known for use in liquid electrolyte nickel-metal hydride batteries. These materials may be $AB_2$ or $AB_5$ type metal hydride materials. They may be amorphous, polycrystalline, microcrystalline, nanocrystalline, single crystal or multi-structural materials. They may include only a single compositional phase or may include multiple compositional phases. An extensive review of the known metal hydride materials useful in electrochemical cells is given in U.S. Pat. No. 5,096,667, the disclosure of which is herein incorporated by reference.

In addition to the known metal hydride materials, new metal hydride systems can be developed to take advantage of the environmental differences between an alkaline liquid electrolyte system and the present thin-film solid electrolyte systems. For example, in a liquid electrolyte system, there is generally a problem with corrosion of the electrode due to the caustic nature of the alkaline electrolyte. Therefore, elements which provide corrosion resistance must be added to the negative electrode material to mitigate corrosion damage. In the solid electrolyte system of the present invention, no such corrosion problems will occur due to the absence of caustic liquids and as such, no corrosion inhibitor materials will need to be added to the negative electrode. Of particular interest is Mg and MgNi based hydrogen storage alloys. Previously Ovonic Battery produced Mg—Ni thin film battery electrode material by an RF sputtering technique. The measured capacity of these alloys was over 700 mAh/g (see U.S. Pat. No. 5,506,069, the disclosure of which is herein incorporated by reference). Ovonic also produced bulk Mg—Ni powder with a capacity of 550 mAh/g (see U.S. Pat. No. 5,616,432, the disclosure of which is herein incorporated by reference). The chief problem of using Mg—Ni alloy electrode material in an alkaline electrolyte is high oxidation rate of the material along grain boundaries. This gives the material an unacceptable cycle life in alkaline batteries. However, using a solid electrolyte design will allows the Mg—Ni with an extended life.

The negative electrode active metal hydride material may be made by a gas atomization process. Such a process can produce MH powder as small as 1-2 micron in size (see U.S. Pat. No. 7,131,597, the disclosure of which is herein incorporated by reference). These powders are suitable for large area printing techniques for electrode fabrication, i.e. screen printing, jet printing, etc. For example, the fine powder may be screen-printed onto a substrate with <1% conductive binder to form a 50 microns thick negative electrode.

The positive electrode layer 5 is typically between 2 and 100 microns thick and is formed from a material which desorbs and adsorbs protons (hydrogen ions) during charging and discharging thereof, respectively. Typically the layer is formed from a transition metal hydroxide such as nickel hydroxide material. The nickel hydroxide material can be any of those material known in the prior art for use in rechargeable battery systems. They may also be advanced active materials like the locally ordered, disordered, high capacity, long cycle life positive electrode material disclosed in U.S. Pat. Nos. 5,344,728 and 5,348,822, the disclosures of which are incorporated herein by reference. These materials include a solid solution nickel hydroxide electrode material having a multiphase structure and at least one compositional modifier to promote said multiphase structure. The multiphase structure comprises at least one polycrystalline γ-phase including a polycrystalline γ-phase unit cell comprising spacedly disposed plates with at least one ion incorporated around the plates, the plates having a range of stable intersheet distances corresponding to a $2^+$ oxidation state and a $3.5^+$ or greater, oxidation state. The compositional modifier is a metal, a metallic oxide, a metallic oxide alloy, a metal hydride, and/or a metal hydride alloy. Preferably the compositional modifier is chosen from the group consisting of Al, Bi, Co, Cr, Cu, Fe, In, LaH$_3$, Mn, Ru, Sb, Sn, TiH$_2$, TiO, Zn and mixtures thereof. More preferably, at least three of these compositional modifiers are used. The at least one chemical modifier incorporated is preferably chosen from the group consisting of Al, Ba, Ca, Co, Cr, Cu, F, Fe, K, Li, Mg, Mn, Na, Sr, and Zn.

Positive electrode active material γ-phase nickel hydroxide is known side to exhibit 1.7 electron charge/discharge transfer per nickel atom compared to the conventional 1 electron transfer from β-phase nickel hydroxide. Unfortunately, the lattice expansion from water intercalation between the nickel hydroxide plates of γ-phase nickel hydroxide shatters the positive electrode and severely deteriorates battery cycle life. Ovonic's disordered γ-phase nickel hydroxide product (see U.S. Pat. No. 5,348,822) can achieve high electron transfer without the water intercalation. Therefore energy density of the nickel hydroxide can be as high as 425 mAh/g. Another problem related to the high oxidation state of Ni (+3.7, i.e. 1.7 electron transfer) is the competition with oxygen evolution in a aqueous environment. In an aqueous electrolyte battery, the positive electrode cannot be charged higher than 0.4V with respect to the Hg/HgO reference electrode. Fortunately, in the inventive solid electrolyte case, the γ-phase nickel hydroxide will readily charge to higher potential without the concerns of oxygen evolution. Other metal oxides with an even higher potential can further improve the energy density of the cell.

The positive electrode material may be deposited by atomic layer deposition (ALD), which has been demonstrated to grow oxide or hydroxide thin films. Alternatively, the positive electrode active material can be formed into an ultra-fine power and be spray coated or screen printed or the like. ALD is a self-limiting (the amount of film material deposited in each reaction cycle is constant), sequential surface chemistry that deposits conformal thin-films of materials onto substrates of varying compositions. ALD is similar in chemistry to chemical vapor deposition (CVD), except that the ALD reaction breaks the CVD reaction into two half-reactions, keeping the precursor materials separate during the reaction. Due to the characteristics of self-limiting and surface reactions, ALD film growth makes atomic scale deposition control possible. By keeping the precursors separate throughout the coating process, atomic layer control of film growth can be obtained as fine as ~0.1 Å (10 pm) per monolayer. Separation of the precursors is accomplished by pulsing a purge gas (typically nitrogen or argon) after each precursor pulse to remove excess precursor from the process chamber and prevent 'parasitic' CVD deposition on the substrate. The growth of material layers by ALD consists of repeating the following characteristic four steps:
1) Exposure of the first precursor;
2) Purge or evacuation of the reaction chamber to remove the non-reacted precursors and the gaseous reaction by-products;
3) Exposure of the second precursor—or another treatment to activate the surface again for the reaction of the first precursor; and
4) Purge or evacuation of the reaction chamber.
Each reaction cycle adds a given amount of material to the surface, referred to as the growth per cycle. To grow a material layer, reaction cycles are repeated as many as required for the desired film thickness. One cycle may take time from 0.5 s to a few seconds and deposit between 0.1 and 3 Å of film thickness. Before starting the ALD process, the surface is stabilized to a known, controlled state, usually by a heat treatment. Due to the self-terminating reactions, ALD is a surface-controlled process, where process parameters other than the precursors, substrate, and temperature have little or no influence. Also, because of the surface control, ALD-grown films are extremely conformal and uniform in thickness.

Between the negative electrode layer 3 and the positive electrode layer 5, is deposited a thin-film solid state electrolyte layer 4. This layer is typically between about 0.5 and 10 microns thick, but may be as thin as 1000 Angstroms if the layer onto which it is deposited has a low degree of surface roughness. The charging cycle electrode reactions of the instant rechargeable metal hydride battery are:

M+H$^+$+e$^-$-CHARGE>MH; and

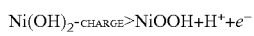

Ni(OH)$_2$-CHARGE>NiOOH+H$^+$+e$^-$

Therefore, the solid state electrolyte layer 4 which separates the positive electrode layer 5 and the negative electrode layer 3 must be a hydrogen ion (proton) conductor. That is, the solid electrolyte material must be capable of readily conducting or transporting protons from the positive electrode layer 5 to the negative electrode layer 3 while the battery is charging and from the negative electrode layer 3 to the positive electrode layer 5 while the battery is discharging. The solid electrolyte layer 4 must also be electrically insulating so that the battery electrodes do not short. That is, the electrolyte also acts as the electrode separator. The present inventors have found that newly developed perovskite-type oxides demonstrate reasonable hydrogen storage capacity. Further, the hydrogen conductivity at moderately elevated temperature (100° C.) is excellent and therefore the perovskite-type oxides can be used as the solid electrolyte 4 for metal hydride battery. The Perovskite-type oxides may contain one or more of Ba, Sr, Zr, Sc, Y, La, Ce, Pr, Nd, Pm, Sm, Eu, Gd, Tb, Dy, Ho, Er, Tm, Yb, Lu, Fe, Cr, Al, Ti, Mg, Sn, and In. The choice of a good solid electrolyte will depend on both low transport resistance and high hydrogen storage.

The term "perovskite-type oxides" means oxide materials having a perovskite crystalline structure. A perovskite structure is any material with the same type of crystal structure as calcium titanium oxide (CaTiO$_3$), known as the perovskite structure, or $^{XII}$A$^{2+VII}$B$^{4+}$X$^{2-}_3$ with the oxygen in an fcc. Perovskites take their name from this compound, which was first discovered in the Ural Mountains of Russia by Gustav Rose in 1839 and is named after Russian mineralogist, L. A. Perovski (1792-1856). The general chemical formula for perovskite compounds is ABX$_3$, where 'A' and 'B' are two cations of very different sizes, and X is an anion that bonds to both. The 'A' atoms are larger than the 'B' atoms. The ideal cubic-symmetry structure has the B cation in 6-fold coordination, surrounded by an octahedron of anions, and the A cation in 12-fold cuboctahedral coordination. The relative ion size requirements for stability of the cubic structure are quite stringent, so slight buckling and distortion can produce several lower-symmetry distorted versions, in which the coordination numbers of A cations, B cations or both are reduced.

The perovskite structure is adopted by many oxides that have the chemical formula ABO$_3$. In the idealized cubic unit cell of such a compound, type 'A' atom sits at cube corner positions (0, 0, 0), type 'B' atom sits at body centre position (½, ½, ½) and oxygen atoms sit at face centered positions (½, ½, 0). The relative ion size requirements for stability of the cubic structure are quite stringent, so slight buckling and distortion can produce several lower-symmetry distorted versions, in which the coordination numbers of A cations, B cations or both are reduced. Tilting of the BO$_6$ octahedra reduces the coordination of an undersized A cation from 12 to as low as 8. Conversely, off-centering of an undersized B cation within its octahedron allows it to attain a stable bonding pattern. The resulting electric dipole is responsible for the property of ferroelectricity and shown by perovskites such as $BaTiO_3$ that distort in this fashion. The orthorhombic and tetragonal phases are most common non-cubic variants. Complex perovskite structures contain two different B-site cations. This results in the possibility of ordered and disordered variants.

The perovskite-type oxide may be fabricated by the Czochralski method. Alternatively the layer of perovskite oxide may be prepared by a spin-coat sol gel process. The sol-gel process is a wet-chemical technique (a.k.a. chemical solution deposition) widely used recently in the fields of materials science and ceramic engineering. Such methods are used primarily for the fabrication of materials (typically a metal oxide) starting from a chemical solution which acts as the precursor for an integrated network (or gel) of either discrete particles or network polymers. Typical precursors are metal alkoxides and metal chlorides, which undergo various forms of hydrolysis and polycondensation reactions. The formation of a metal oxide involves connecting the metal centers with oxo (M-O-M) or hydroxo (M-OH-M) bridges, therefore generating metal-oxo or metal-hydroxo polymers in solution. Thus, the sol evolves towards the formation of a gel-like diphasic system containing both a liquid phase and solid phase whose morphologies range from discrete particles to continuous polymer networks.

In the case of the colloid, the volume fraction of particles (or particle density) may be so low that a significant amount of fluid may need to be removed initially for the gel-like properties to be recognized. This can be accomplished in any number of ways. The most simple method is to allow time for sedimentation to occur, and then pour off the remaining liquid. Centrifugation can also be used to accelerate the process of phase separation.

Removal of the remaining liquid (solvent) phase requires a drying process, which is typically accompanied by a significant amount of shrinkage and densification. The rate at which the solvent can be removed is ultimately determined by the distribution of porosity in the gel. The ultimate microstructure of the final component will clearly be strongly influenced by changes imposed upon the structural template during this phase of processing. Afterwards, a thermal treatment, or firing process, is often necessary in order to favor further polycondensation and enhance mechanical properties and structural stability via final sintering, densification and grain growth. One of the distinct advantages of using this methodology as opposed to the more traditional processing techniques is that densification is often achieved at a much lower temperature.

The precursor sol can be either deposited on a substrate to form a film (e.g., by dip coating or spin coating), cast into a suitable container with the desired shape (e.g., to obtain monolithic ceramics, glasses, fibers, membranes, aerogels), or used to synthesize powders (e.g., microspheres, nanospheres). The sol-gel approach is a cheap and low-temperature technique that allows for the fine control of the product's chemical composition. Even small quantities of dopants, such as organic dyes and rare earth elements, can be introduced in the sol and end up uniformly dispersed in the final product. The sol-gel process can be used in ceramics processing and manufacturing as an investment casting material, or as a means of producing very thin films of metal oxides for various purposes. Sol-gel derived materials have diverse applications in optics, electronics, energy, space, (bio)sensors, medicine (e.g., controlled drug release), reactive material and separation (e.g., chromatography) technology.

Figure 2:
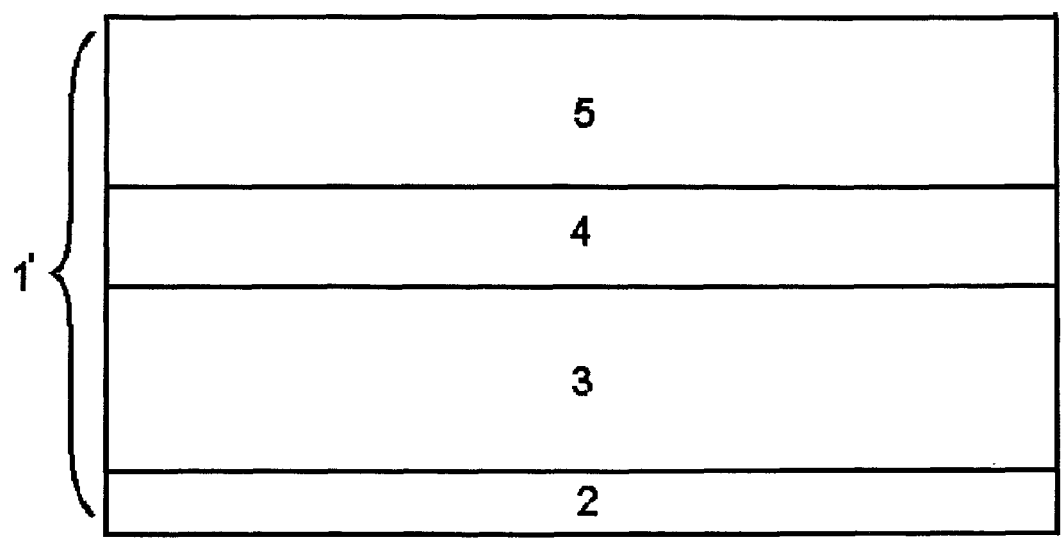
FIG. 2 is a schematic depiction of a cross-section of a single unit from which a stacked bipolar NiMH battery may be formed.

FIG. 1 shows a basic single cell battery of the instant invention including two terminals 2, one negative electrode material 3 layer, one positive electrode material layer 5, and one solid electrolyte layer 4. FIG. 2 shows another embodiment 1' of the instant invention. In this alternative embodiment, one of the two terminals 2 is eliminated. This allows for multiple units thereof to stacked on top of each other to form larger multi-cell bipolar batteries.

One advantage of a bipolar design is to increase the power by increase the contact area between cells. This design using Al foil connecting cells together through large area contact will reduce the internal impedance from 5 m$\Omega$ to 0.5 m$\Omega$. In battery technologies, it is useful to adopt a thin separator. In the present invention, the thickness of the separator will depend on the smoothness of the negative electrode. When made by gas atomization specially designed for 1 micron particle size, the roughness of the negative electrode can be controlled below 1 micron. Therefore, an oxide made by spin-coat sol gel process can be as thin as 2 microns and still be able to cover the surface of negative electrode. The impedance through this ultra-thin solid electrolyte can be minimal. The overall power density of this new device may be between 5,000 and 10,000 Watt per Kg.

Furthermore, assuming a 1.5 volt battery with 1 Ah capacity, the battery would require less than 2 grams of MgNi negative electrode active material plus binder, less than 2.4 grams of γ-phase nickel hydroxide, 0.2 grams of oxide separator, 0.2 grams of Al foil, and negligible weight from the plastic battery can. Thus a 1.5 Wh battery can be created with less than 5 gram of material. The gravimetric energy density of such a battery is 300 Wh/kg.

Since the negative electrode contains no rare earth elements nor transition metals like Co, Zr and Ti, the cost of the negative electrode (particularly Mg—Ni) can be very low. The positive electrode will contain no Co which is used extensively in conventional Ni-MH and Li-ion batteries. The overall raw material cost for the 1.5 Wh battery described above would be: 2.6 cents for 2 g Mg—Ni ($13/kg), 2.9 cents for 2.4 g NiOOH ($12/kg), 1 cent for 0.2 g Oxide ($50/kg), 0.04 cents ($2.1/kg) plus some plastic. The total raw material cost is less than 7 cents for 1.5 Wh. So the raw material cost for this high energy, high power battery pack will be $47 per kWh. Considering the contemplated processes involved in making the battery (gas atomization at 1 ton capacity, conventional processes for making nickel hydroxide powder, screen printing of positive and negative electrode, and spin-coat sol gel process), the present inventors believe that the process cost will not exceed the raw material cost. Thus, the final fabrication cost of a 1 kWh battery will be below $100.

While specific methods/process of fabricating the solid-state battery fo the present invention have been described above, other processes are within the realm of the present invention. Other contemplated deposition processes include, but are not limited to, sputtering, evaporation, chemical vapor deposition (CVD), microwave plasma enhanced CVD (PECVD), radio frequency PECVD, physical vapor deposition (PVD), plasma enhanced PVD, laser ablation, spray coating, and plasma spraying. The choice of deposition process will depend upon many factors such as materials to be deposited, precursor starting materials used, pressures/vacuums required by the process, cost, electrochemical and physical quality of deposited materials, and others.

Therefore, it can clearly be seen that the solid state batteries of the present invention show tremendous promise for commercial, industrial and consumer uses. Particularly, with regard to the energy densities and costs shown above, application of these batteries to hybrid electric vehicles would be highly advantageous. It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

The invention claims is:

1. A solid state battery including at least one multilayered battery cell comprising:
   1) a solid state layer of negative electrode material capable of adsorbing and desorbing protons during charge and discharge;
   2) a solid state layer of positive electrode material capable of desorbing and adsorbing protons during charge and discharge; and
   3) a solid state layer of perovskite-type oxide material disposed between said layer of positive electrode material and said layer of negative electrode material, where said layer of perovskite-type oxide material consists of perovskite-type oxide and is electrically insulating and capable of readily conducting or transporting protons from said layer of positive electrode material to said layer of negative electrode material while said battery is charging and from said layer of negative electrode material to said layer of positive electrode material while said battery is discharging; said perovskite material having a room temperature hydrogen conductance in the range of 0.0231 to 91 S/cm.

2. The solid state battery of claim 1, wherein said layer of negative electrode material, said layer of positive electrode material, and said layer of perovskite-type oxide material are all thin film materials.

3. The solid state battery of claim 2, wherein said layer of positive electrode material comprises a transition metal hydroxide.

4. The solid state battery of claim 3, wherein said transition metal hydroxide is a nickel hydroxide material which provides approximately one electron transfer.

5. The solid state battery of claim 3, wherein said nickel hydroxide material is a γ-phase nickel hydroxide which provides approximately 1.7 electron transfer.

6. The solid state battery of claim 2, wherein said layer of negative electrode material is a metal hydride material.

7. The solid state battery of claim 6, wherein said layer of negative electrode material is disordered.

8. The solid state battery of claim 6, wherein said layer of negative electrode material is a multiphase material, which includes one or more of amorphous, nanocrystalline, microcrystalline or polycrystalline phases.

9. The solid state battery of claim 6, wherein said layer of negative electrode material includes a Mg-Ni type hydrogen storage alloy material.

10. The solid state battery of claim 1, wherein said perovskite-type oxide material comprises one or more elements selected from the group consisting of Ba, Sr, Zr, Sc, Y, La, Ce, Pr, Nd, Pm, Sm, Eu, Gd, Tb, Dy, Ho, Er, Tm, Yb, Lu, Fe, Cr, Al, Ti, Mg, Sn, and In.

11. The solid state battery of claim 1, wherein said at least one multilayered battery cell further includes electrically conductive bottom and top battery terminal layers adjacent to said solid state layers of negative electrode material and positive electrode material and remote from said solid state layer of perovskite-type oxide material.

12. The solid state battery of claim 11, wherein said electrically conductive bottom and top battery terminal layers are formed from an electrically conductive metal selected from the group consisting of aluminum, nickel, copper and alloys, mixtures or composites thereof.

13. The solid state battery of claim 12, wherein said electrically conductive bottom and top battery terminal layers are formed from aluminum.

14. The solid state battery of claim 11, wherein said electrically conductive bottom and top battery terminal layers are formed from an electrically conductive ceramic or oxide material.

15. The solid state battery of claim 1, comprising:
   more than one of said multilayered battery cells and further comprises:
   battery terminal layers deposited between said layer of positive electrode material of one multilayered battery cell and said layer of negative electrode material of an adjacent multilayered battery cell.

16. The solid state battery of claim 15, wherein said battery terminal layers deposited between said multilayered battery cells is formed from aluminum.

* * * * *